United States Patent Office 3,342,038
Patented Sept. 19, 1967

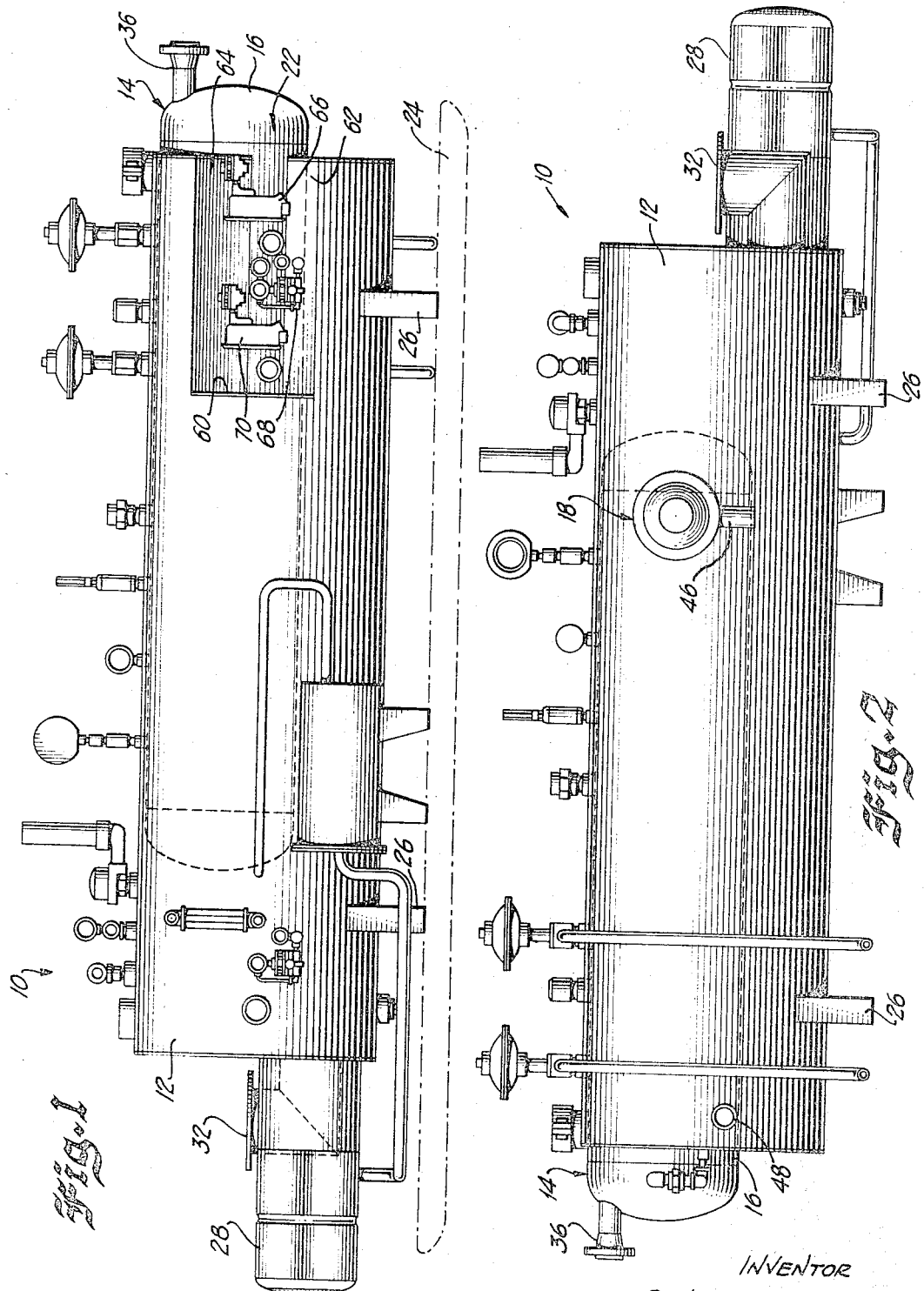

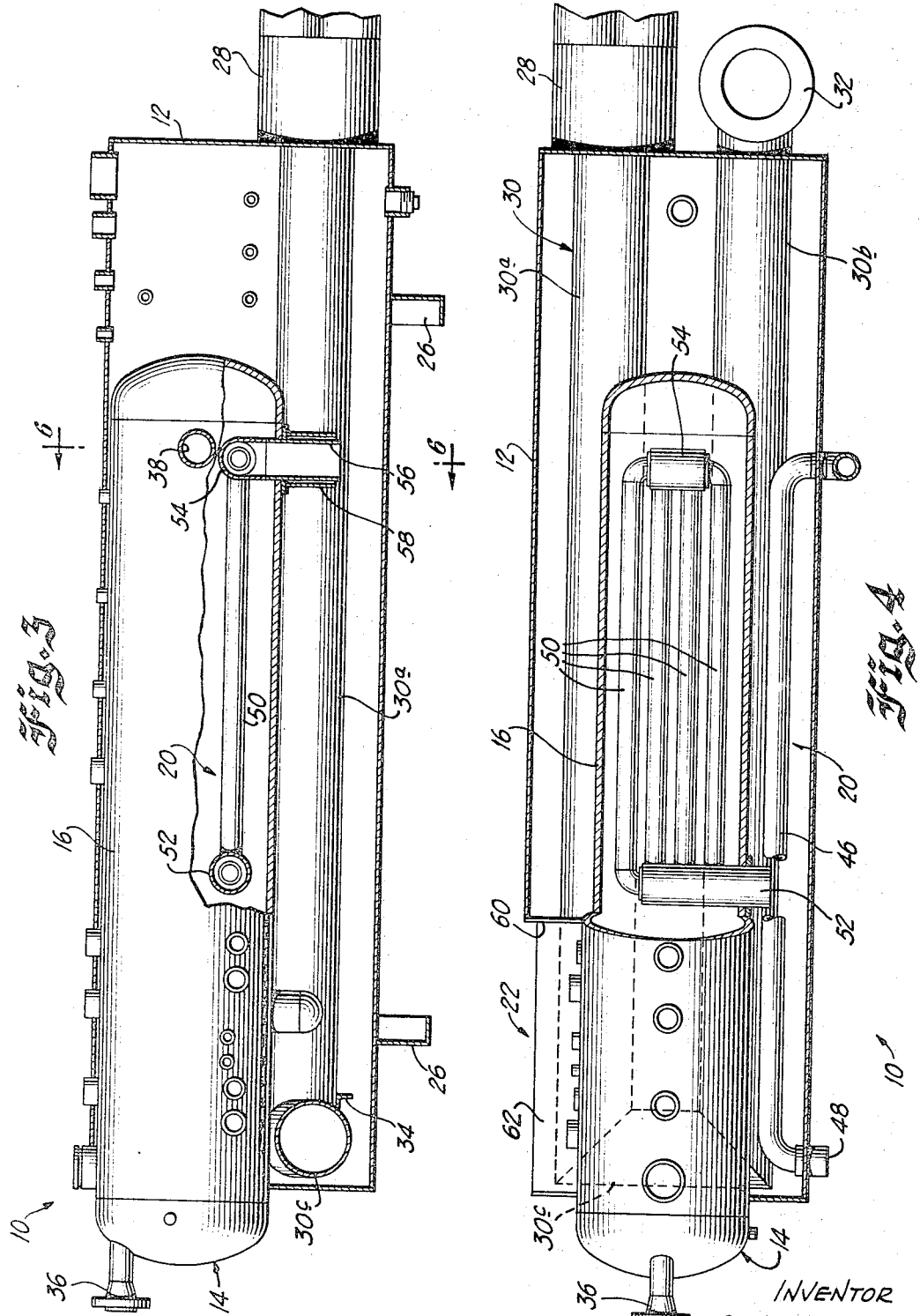

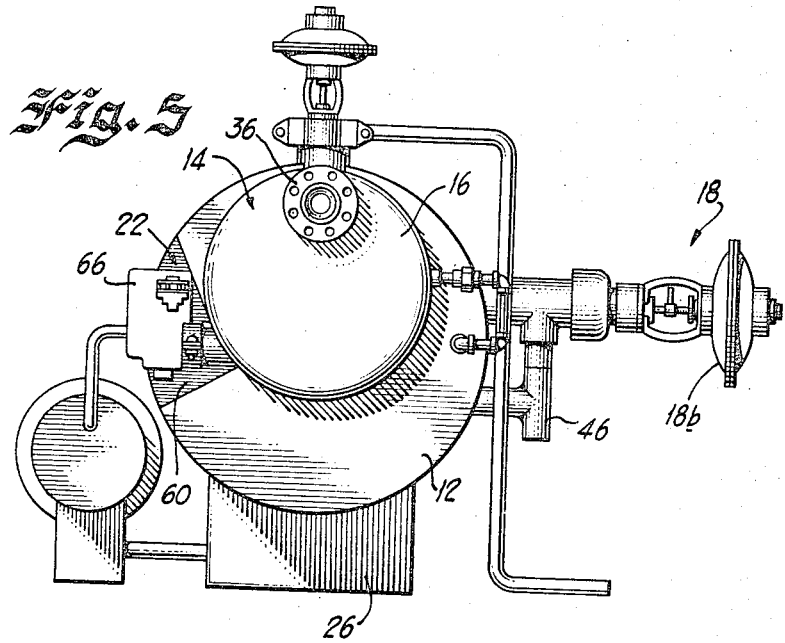
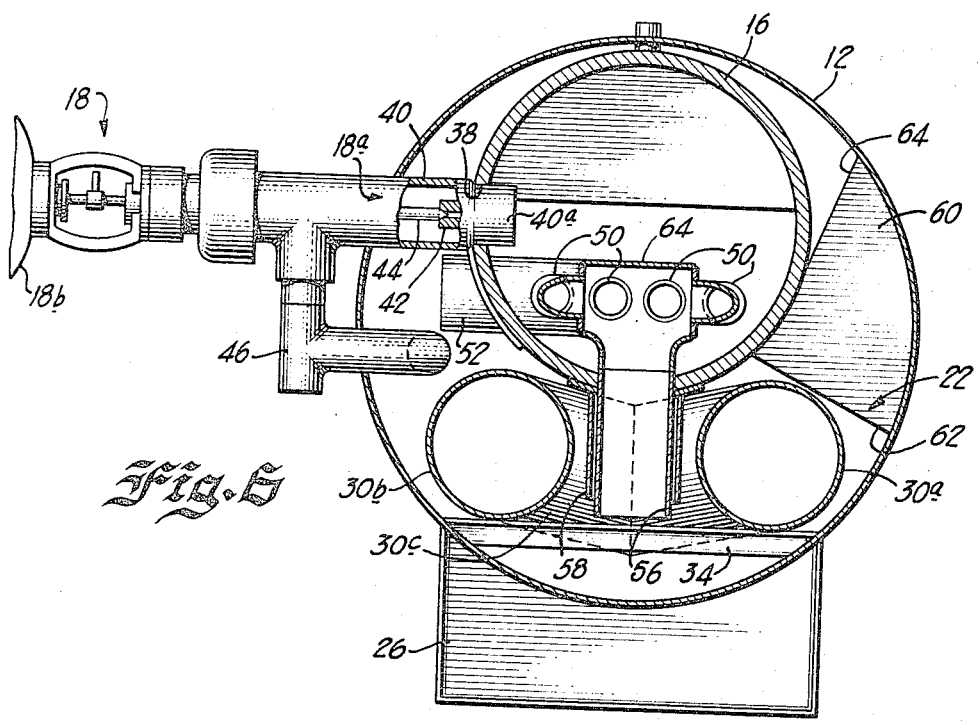

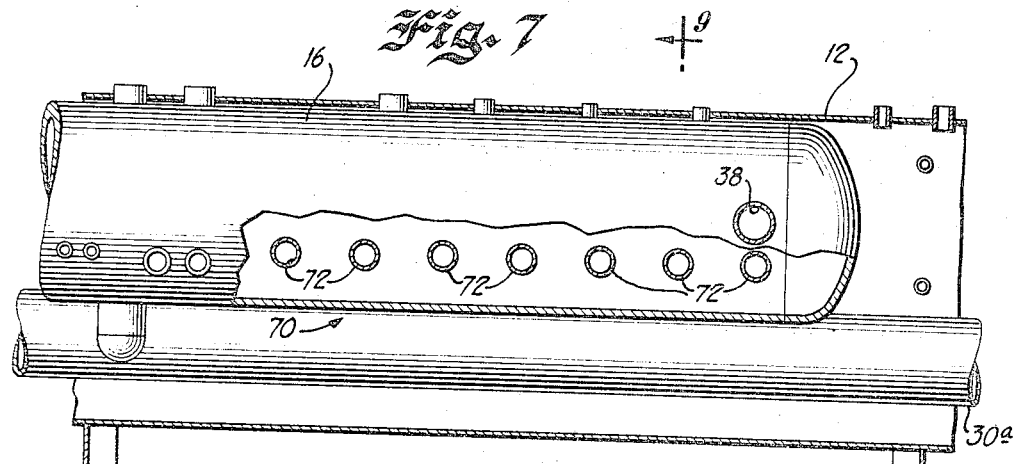
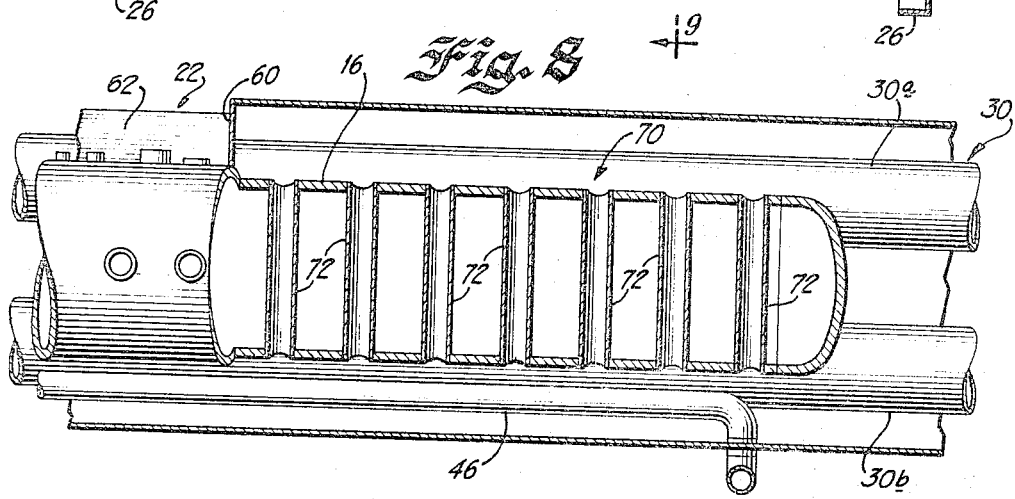
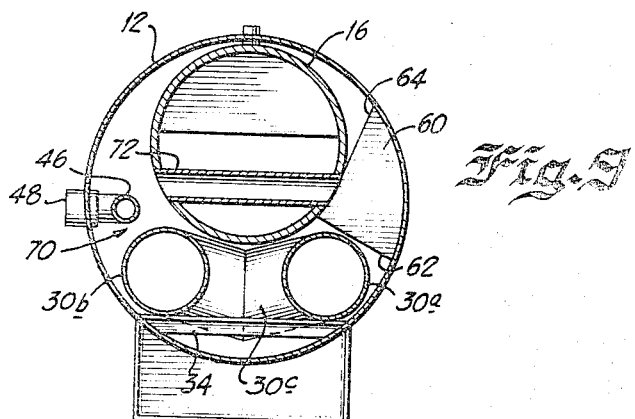

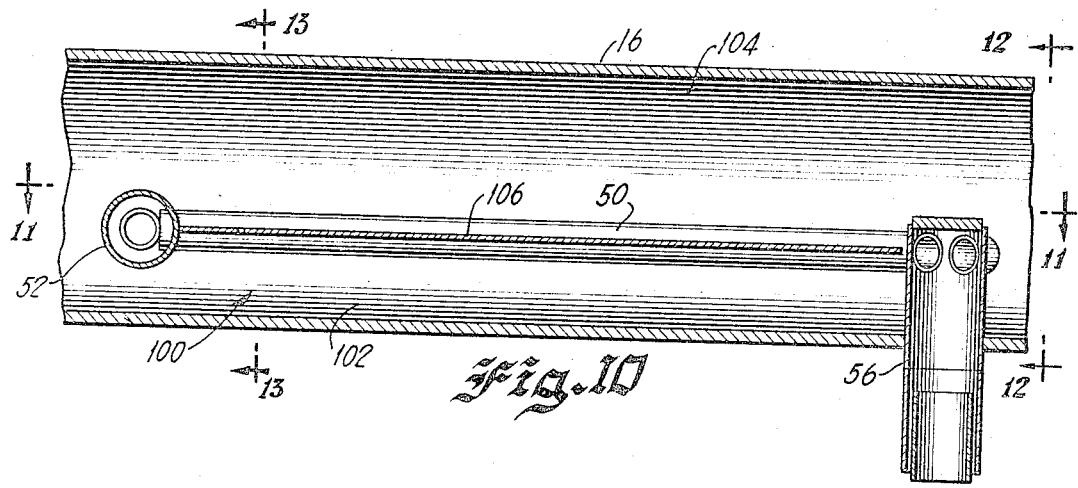
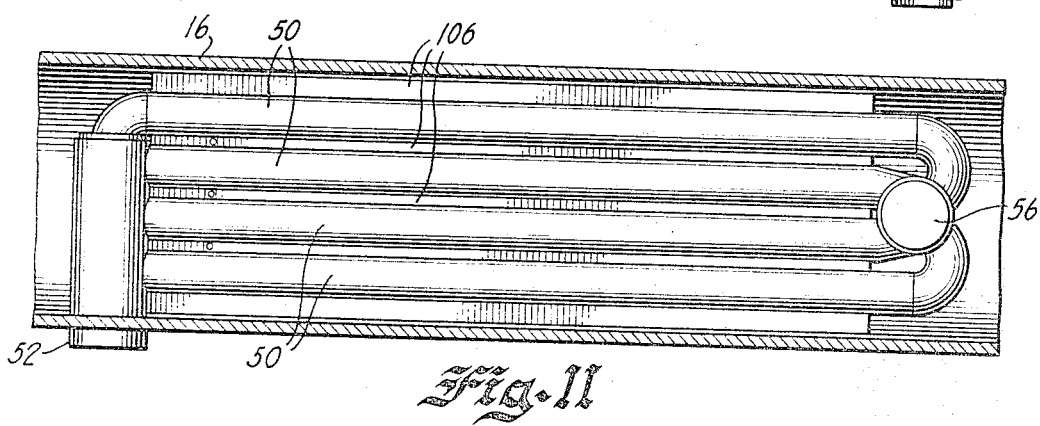
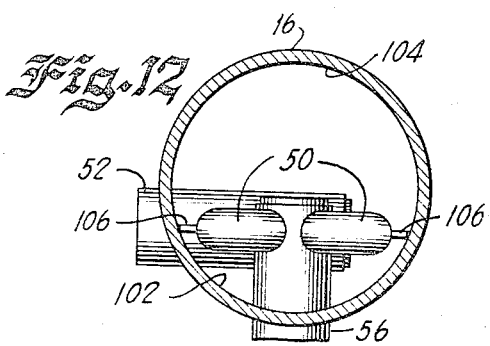
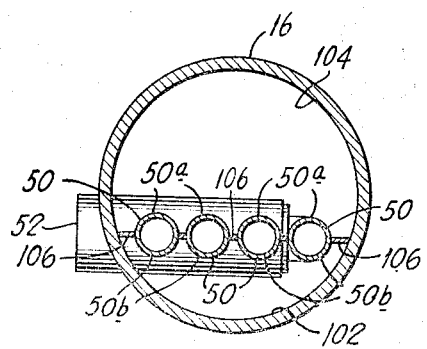
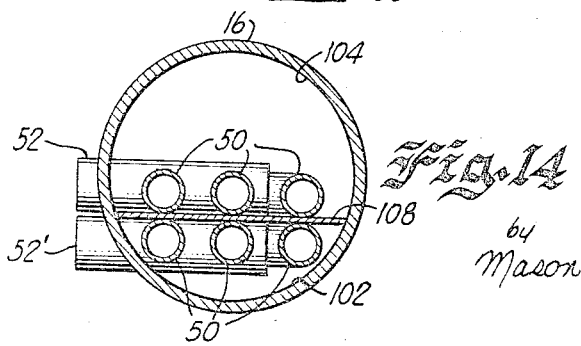

3,342,038
NATURAL GAS LOW TEMPERATURE EXPANSION WITH HEATER TO PREVENT HYDRATE CLOGGING
Gene O. Sinex, P.O. Box 1110,
Farmington, N. Mex. 87401
Filed Nov. 13, 1964, Ser. No. 412,589
18 Claims. (Cl. 62—37)

ABSTRACT OF THE DISCLOSURE

A well head production unit including a separator vessel disposed in a heating tank containing a fluid heat transfer medium. A burner and fire tube arrangement is provided for heating the fluid medium in the heating tank and the fluid medium is circulated through a heat exchanger within the separator vessel. Well fluid is introduced into the separator vessel through a choke having a valve portion immersed in the fluid heat transfer medium between a wall of the separator vessel and a wall of the heating vessel. The heating vessel is formed with a recessed area or indentation which exposes a portion of the separator vessel wall and the production unit controls are mounted in the recessed area to provide for direct contact of the sensitive elements of the controls with the fluids in the separator vessel.

This invention relates to a production unit for use with well fluids and, more particularly, to a low temperature production unit including a low temperature separator. This application is a continuation-in-part of copending application Ser. No. 332,692, filed Dec. 23, 1963, now abandoned.

Natural gas at the well head commonly includes oil and dissolved or entrained water that must be removed before the gas can be transported over a line for commercial use. One type of production unit used at the well head for gas dehydration or separation includes a low temperature separator in which the pressure of the well stream is reduced on admission to the separator. This low temperature separation is most efficiently carried out in the presence of heat which must be applied both to the pressure reducing or stream input choke means to prevent clogging by ice or gas hydrates resulting from the pressure reduction and to the separator vessel or tank to melt ice and hydrate particles so that they can be removed from the separator as fluid or liquid components. The application of heat to the separator vessel also aids in stabilizing the recovered hydrocarbons. Since the production units are generally located at the well head, it is also necessary to protect the unit, particularly the controls or instruments, against adverse weather conditions. Various prior production units, such as the one shown in United States Patent No. 3,078,648, have been constructed in an attempt to provide controlled quantities of heat for low temperature separators. However, these units are not capable of supplying heat in as efficient a manner as desired or in sufficient quantities for efficient operation of the separator under certain types of operating conditions. In addition, these units generally do not provide adequate cold weather protection for the instrumentation.

Accordingly, one object of the present invention is to provide a new and improved well stream production unit.

Another object is to provide a new and improved low temperature separator.

Another object is to provide a low temperature separator including a new and improved indirect heating means.

Another object is to provide a low temperature separator including novel means for efficiently supplying heat not only to the separator vessel but also to the well stream input choke and an instrument or control area.

Another object is to provide a low temperature production unit having a choke means at least partially immersed in a heat transfer fluid contained in a heating vessel in which a separator vessel is also immersed.

Another object is to provide a low temperature separator including new and improved heating construction affording cold weather protection to control instrumentation.

Another object is to provide an indirectly heated low temperature separator including new and improved means for effecting heat transfer to the contents of the separator vessel.

A further object is to provide a production unit in which the interior of a separator vessel is at least partially divided into separate gas and liquid spaces by a partition means and in which heat transfer medium conveying means disposed in proximity to the partition means includes surfaces exposed to the gas and liquid spaces.

Another object is to provide a production unit having a separator vessel in which a wall dividing at least a portion of the interior of the vessel into separate gas and liquid spaces is formed by partition structures and surfaces of a heat transfer medium conveying means.

In accordance with these and many other objects, an embodiment of a low temperature production unit embodying the present invention includes a generally cylindrical heating vessel or tank in which is disposed substantially all of an elongated cylindrical vessel or tank of a low temperature separator with the upper wall of the separator vessel disposed immediately adjacent the upper wall of the heating vessel. Firebox or fire tube means are disposed in the lower end of the heating vessel, and this vessel is substantially completely filled with a heat transfer liquid such as glycol or a glycol-water mixture in which the fire tube means and substantially all of the separator vessel are immersed. The separator unit, which is one of the low temperature types known in the industry, receives the well stream fluids and removes water and hydrocarbon components from the well stream to supply substantially dry gas to a sales line or storage.

The well stream input to the separator unit is supplied through a pressure reducing valve or choke means including both a valve portion and a control portion. In accordance with one feature of the present invention, the control portion of the choke is mounted outside of the heating vessel and the valve or pressure reducing portion is disposed in a position interposed between the walls of the separator vessel and the heating vessel with the pressure reducing portion immersed in the heat transfer fluid. This fluid heats the valve portion to avoid any clogging of the choke by ice or gas hydrate particles formed as a result of the pressure reduction in the well fluid stream supplied to the interior of the separator vessel. In this manner, any clogging of the choke means is prevented without requiring the provision of separate heating or jacketing means.

In accordance with another feature of the present invention, the substantially complete immersion of the separator tank in the heating vessel together with the relative position of the fire tube means within the heating vessel insures the controlled application of sufficient quantities of heat to the separator vessel through the heat transfer liquid to permit the separator to be operated over widely varying ranges of operating conditions. To insure the application of sufficient quantities of heat to the contents of the separator vessel, this vessel is provided with a plurality of fluid conveying means which are sealed off from communication with the interior of the vessel and which are in open communication with the heat transfer liquid in the heating vessel. The flow of the heat transfer liquid through these fluid conveying means, which extend transverse to the axis of the separator tank in one embodiment and parallel to this axis in another embodiment, insures the application of sufficient heat to the fluid contents of the separator. In one embodiment, the separator vessel is at least partially divided into separate gas and liquid spaces by partition means, and the conveying means for the heat transfer medium includes surfaces exposed to the gas and liquid spaces on opposite sides of the partition means. This heating is frequently necessary for melting the gas hydrates and ice particles, for stabilizing collected hydrocarbons, and for increasing the speed at which the separation or dehydration operation takes place.

To insure the operability of the various control instruments associated with the production unit, the heating tank or vessel is provided with a recess or intended portion terminating in an arcuate side wall section of the separator vessel in which the critical control instruments are disposed. This control area at least partially overlies a section of the fire tube and is substantially enclosed to receive radiated and conducted heat from the adjacent surfaces of the separator tank and the heating tank. The area is also spaced above the ground. The provision of the instrumentation area bounded on virtually all sides by heated surfaces tends to prevent any malfunctioning of the control instruments in adverse weather conditions.

Many other objects and advantages of the present invention will become apparent from considering the following detailed description in conjunction with the drawings in which:

FIG. 1 is a side elevational view of a well fluid production unit embodying the present invention;

FIG. 2 is an opposite side elevational view of the production unit;

FIG. 3 is a fragmentary sectional view of the production unit similar to FIG. 2;

FIG. 4 is a top elevational view, in partial section, of the well production unit;

FIG. 5 is an end elevational view of the production unit;

FIG. 6 is an enlarged sectional view taken along line 6—6 in FIG. 3;

FIG. 7 is a fragmentary sectional view similar to FIG. 3 illustrating a second embodiment of the present invention;

FIG. 8 is a fragmentary top elevational view of the production unit shown in FIG. 7;

FIG. 9 is a sectional view taken along line 9—9 in FIG. 7;

FIG. 10 is a fragmentary sectional view of modified form of a heat transfer structure for a separator vessel;

FIG. 11 is a sectional view taken along line 11—11 in FIG. 10;

FIG. 12 is a sectional view taken along line 12—12 in FIG. 10;

FIG. 13 is a sectional view taken along line 13—13 in FIG. 10; and

FIG. 14 is a sectional view of another embodiment of the heat transfer structure.

Referring now more specifically to FIGS. 1–6 of the drawings, therein is illustrated a well production unit which is indicated generally as 10 and which embodies the present invention. The production unit 10 includes an outer horizontally extending cylindrical heating vessel or tank 12 in which a low temperature separator unit indicated generally as 14 is disposed with substantially all of the outer surface of an elongated cylindrical separator vessel 16 disposed within the heating vessel 12 and immersed in a heat transfer fluid that substantially fills the interior of the heating vessel 12. The well stream fluids are supplied to the low temperature separator 14 through a pressure reducing means or choke means indicated generally as 18 having a valve portion that is immersed in the heat transfer fluid in the heating vessel 12 to avoid clogging or any malfunction due to gas hydrates or ice particles. Although substantially the entire tank 16 of the separator unit 14 is immersed in the heat transfer fluid within the heating vessel 12, a heat transfer assembly indicated generally as 20 (FIGS. 3 and 4) assures the application of adequate quantities of heat to the contents of the separator unit 14. A recessed control or instrument area 22 (FIG. 1) is formed in the structure of the heating vessel 12 to prevent malfunctioning of or damage to the control instruments of the separator unit 14, the area 22 being protected to a large degree from contact with the ambient atmosphere and being defined by heat radiating and conducting surfaces.

The heating tank 12 of the indirect heating means in the production unit 10 comprises a generally elongated and horizontally extending cylinder supported on a skid 24 or other suitable ground engaging means by a pair of supporting brackets or legs 26. The heating vessel 12, which is substantially sealed except for removable drain and fill openings and couplings for instruments, is substantially filled with a heat transfer fluid or liquid such as glycol or a glycol-water mixture. The heat transfer liquid within the heating vessel 12 is heated by a firebox or fire tube means including a burner 28 preferably supplied with fuel derived from the production unit 10, which burner is connected to one end of a generally U-shaped fire tube 30. The fire tube means includes a pair of longitudinally extending sections or legs 30a and 30b connected at their inner end by a bight or transversely extending section 30c (FIGS. 4 and 6). The burner 28 is connected to the outer end of the section 30a and the outer end of the leg 30b is connected to an elbow 32 (FIG. 1) having a flange that is adapted to be connected to a stack (not shown). The fire tube means 30 is disposed along the lower wall of the heating vessel 12 below the tank 16 of the separator unit 14 with its lower edge resting on one or more transverse supporting elements or braces 34 (FIG. 3). The bight or connecting portion 30c preferably is formed with the somewhat V-shaped configuration (FIG. 6) to permit the legs 30a and 30b of the fire tube means 30 to be disposed in proximity to the adjacent wall surfaces of the separator tank 16.

The low temperature separator unit 14 can be of any well-known construction but preferably is of a construction similar to that shown and described in detail in the copending application of Gene O. Sinex, Ser. No. 279,370, filed May 10, 1963. This separator unit, which includes a dry gas outlet 36 and well stream inlet opening 38 (FIG. 3), is disposed substantially entirely within the heating vessel 12 with the outlet end of the tank 16 projecting slightly beyond the left-hand wall (FIGS. 2 and 3) of the heating vessel 12. The diameter of the tank or vessel 16 is substantially less than the diameter of the heating vessel 12 (FIG. 6) so that substantially the entire vessel 16 is immersed in and contacted throughout its wall surfaces by the heat transfer fluid contained within the heating vessel 12. The separator unit 14 includes means for separating water and hydrocarbon components from the gas of the well stream and means for discharging the separated water and hydrocarbons from the tank 16. These means can be of the type disclosed in the Sinex application.

The well stream is supplied to the interior of the vessel 16 of the separator unit 14 by the choke means 18 at a pressure that can be substantially below that of the well stream. The choke means or assembly 18 includes a pressure reducing portion or valve portion indicated generally as 18a (FIG. 6) comprising a hollow housing 40 having a reduced diameter portion 40a that is received within the inlet opening 38. The housing 40 carries a member 42 forming a tapered, restricted orifice in which is disposed the tapered end of a valve element 44. The position of the valve element 44 relative to the member 42 is controlled by a control portion 18b of the choke assembly 18 to select the pressure at which the well stream is discharged to the interior of the separator vessel 16. The choke means 18 can also be of the construction shown and described in detail in the copending Sinex application.

The well stream is supplied to the housing 40 of the valve portion 18a of the choke means 18 through a fluid conveying means or line 46 (FIG. 4) which is connected at one end to the housing 40 (FIG. 6) and at its other end to a coupling 48 (FIG. 4) to which a well stream line is connected. The intervening portion of the fluid conveying means 46 passes through the lower portion of the heating vessel 12 in proximity to the section 30b of the fire tube. Thus, the well stream fluids are preheated before application to the choke means 18. In the choke means, the well stream is expanded in the valve portion 18a to enter the separator vessel 16 at a reduced temperature and pressure. This expansion of the well stream in the choke 18 forms ice and hydrate particles that tend to clog the valve opening in the member 42 and otherwise interfere with the proper operation of the choke assembly 18. In accordance with one feature of the present invention, this possible malfunctioning of the choke assembly 18 is avoided without resorting to added or external heating means by disposing the valve portion 18a of the choke between the wall of the separator tank 16 and the wall of the heating tank 12 in a position to be immersed in the heat transfer fluid contained within the vessel 12. In this manner, heat is supplied to the valve portion 18a of the choke means 18 in sufficient quantities to insure proper operation thereof without unduly increasing the size or cost of the choke.

Although virtually the entire outer surface of the separator tank 16 is contacted by the heat transfer fluid, it is desirable or necessary under some operating conditions to be able to apply a greater amount of heat to the contents of the interior of this tank than can be supplied by conduction or radiation resulting from the contact of the heat transfer liquid with the outer surfaces of this tank. The fluid conveying means 20 provides means for directly introducing a portion of the heat transfer fluid from the heating vessel 12 into the interior of the separator unit 14 while retaining the heat transfer fluid sealed from communication therewith. This assembly includes a plurality of conduits or coils 50 (FIGS. 3, 4, and 6) which are disposed in the lower portion of the separator vessel 16 spaced above the lower wall thereof. At one end, the coils or conduits 50 are connected to an inlet header or conduit 52 which extends outwardly through the wall of the vessel 16 at a point disposed above the fire tube means 30. The outer end of the header 52 is in continuous, open communication with the heat transfer fluid within the vessel 12. The other ends of the coils or conduits 50 are connected to a discharge header 54 (FIGS. 4 and 6) connected to a downwardly extending conduit 56 (FIG. 6) which passes through an opening in the lower wall of the separator vessel 16 to be disposed between the two legs 30a and 30b of the fire tube means 30. The conduit 56 is disposed within a heat insulating sleeve or pipe section 58 secured to the lower wall of the separator tank 16. When the fire tube means 30 heats the heat transfer liquid within the vessel 12, the heat transfer medium passes through the conduits or coils 50 of the assembly 20 to apply heat to the contents and interior of the separator vessel 16.

More specifically, the heated fluid rises above the fire tube means 30 and enters the coils or conduits 50 through the inlet 52. The heat transfer fluid in the conduits 50 supplies heat to the contents of the separator unit 14 and is cooled thereby to a temperature substantially below the temperature of the heat transfer medium in the vessel 12. Thus, the transfer fluid in the coils 50 is heavier than the fluid in the vessel 12 and flows downwardly (FIG. 3) through the outlet 56 to be discharged below and between the legs of the fire tube means 30. The insulating sleeve 58 prevents heating of the fluid in the outlet 56. In this manner, a positive flow of the heat transfer medium through the conveying means 20 is provided by a thermosiphon action.

The area 22 provides means substantially sheltered from the ambient atmosphere and heated by the fire tube means 30 and the heating vessel 12 for receiving control instrumentation for the separator unit 14 to prevent any damage thereto and to insure proper operation of these controls under adverse weather conditions. The area 22 is defined by a somewhat wedge-shaped plate 60 (FIGS. 1, 5, and 6) which forms a partial end wall for the heating vessel 12 and two rectangular plates 62 and 64 (FIGS. 1, 4, and 6) which extend from the adjacent walls of the heating vessel 12 inwardly to engage peripherally spaced portions of the outer wall of the separator tank 16. Thus, the walls 60, 62, 64 define an indentation or recessed area providing the instrument area 22. Since the walls 60, 62, and 64 are in direct contact with the heat transfer liquid within the vessel 12, the volume bounded by the plates and the wall of the tank 16 receives heat by convection, radiation, and conduction to prevent damage to the controls and instruments disposed in the area 22. In addition, the wall 62 substantially overlies a section of the leg 30a of the fire tube means (FIGS. 4 and 6) from which it receives heat. Although any necessary or suitable controls or instruments can be located in the area 22, the production unit 10 is shown as including a float-operated oil level controller 66, a liquid section temperature controller 68, and a float-operated water level controller 69 for the separator unit 14. Since the inner ends of the walls defined by the plates 62 and 64 engage peripherally spaced portions of the outer wall surface of the separator tank 16, the necessary controls and instruments, such as the units 66, 68, and 69 can be directly connected to the interior of the separator unit 14 without passing through the heat transfer fluid in the heating vessel 12.

FIGS. 7–9 of the drawings illustrate a second embodiment of the fluid conveying means indicated generally as 70 which is similar to the assembly 20 and which supplies the heat transfer liquid to the interior of the separator tank or shell 16 to provide means for heating the interior and the contents of the separator unit 14. The assembly 70 includes a plurality of separate fluid conveying means or conduits 72 which extend generally across a lower wall portion of the tank 16, spaced along the axis of the tank 16. The opposite ends of the conveying means 72 are in open and continuous communication with the heat transfer liquid in the heating vessel 12 to provide spaced passageways through the lower portion of one end of the separator tank 16 through which the heat transfer liquid heated by the fire tube means 30 can flow to provide a more direct application of heat to the contents of the tank 16.

FIGS. 10–13 of the drawings illustrate an assembly 100 which is similar to the assembly 20 and which supplies a heat transfer liquid or medium to the interior of the separator tank or vessel 16 to provide means for heating the contents of the separator unit 14. The assembly 100 includes the plurality of axially extending coils or conduits 50 which are disposed in the lower portion of the separator vessel 16 spaced above the lower wall thereof. At one end, the conduits 50 are connected to the inlet header or conduit 52 which extends outwardly through the wall of the vessel 16 at a point disposed above the fire tube means 30. The outer end of the header 52 is in continuous, open communication with the heat transfer liquid or medium within the heating vessel 12. The other ends of the conduits or lines 50 are connected to the upper end of the downwardly extending conduit 56 which passes through an opening in the lower wall of the separator vessel 16 to be disposed between the two legs 30a and 30b of the fire tube means 30.

In the separator unit shown in FIGS. 10–13, it is desirable to positively or distinctly define a liquid collecting space 102 and to separate this space from an overlying gas space 104 to avoid the provision of a gas-liquid interface within the separator vessel 16. However, it is also desirable to be able to supply heat to both the gas space 104 and the liquid space 102 from the heat transfer medium without requiring duplicate conveying or transfer means and with as low cost construction as possible. Accordingly, an axially extending wall or partition means separating the interior of the separator vessel 16 into the lower liquid collecting space 102 and the upper gas space 104 is formed by interposing a plurality of plates or wall structures 106 between the various conduits 50 and between the outermost conduits 50 and the walls of the separator vessel 16. In this manner, the interior of the vessel 16 is effectively divided into the two spaces 102 and 104 while providing upper surfaces 50a on the lines or conduits 50 exposed to the gas space 102 and the lower surfaces 50b on these conduits which are exposed to and substantially immersed in liquid collected in the liquid space or section 102. In this manner, a wall structure is provided dividing the interior of the separator vessel 16 into separate and distinct liquid and gas spaces 102 and 104 while permitting the same set of heat transfer conveying means or tubes 50 to be used to supply heat to both of these areas.

FIG. 14 of the drawings discloses another form of heat transfer means for the separator vessel 16 in which the interior of this vessel is divided into the upper gas space 104 and the lower liquid collecting space 102. In the structure shown in FIG. 14, a plate 108 divides the interior of the vessel 16 into the two spaces 102 and 104 and two sets of fluid conveying means 50 are provided. The upper set of the tubes 50 is connected to the inlet header 52 and are disposed above the plate 108 to supply heat to the gas space 104. The second set of tubes 50 is disposed below the plate 108 and connected to an inlet header 52′ to provide means for supplying heat to the fluid in the space 102. The other ends of the tubes, pipes, or conduits 50 can be connected to individual or a common vertical header similar to the header 56.

Although the present invention has been described with reference to several illustrative embodiments thereof, it should be understood that numerous other modifications and embodiments can be devised by those skilled in the art that will fall within the spirit and scope of the principles of this invention.

What is claimed and desired to be secured by Letters Patent of the United States is:

1. A low temperature production apparatus for use with well fluids comprising a heating vessel, a separator vessel disposed in the heating vessel spaced from at least one wall of the heating vessel, said heating vessel being adapted to receive a body of fluid heat transfer medium contacting the walls of the separator vessel, means disposed in the heating vessel spaced from the separator vessel for heating the transfer medium, choke means for supplying well fluid to the separator vessel, said choke means including a valve portion and a control portion for controlling the operation of the valve portion, and means mounting the choke means with the control portion positioned outside of the heating vessel and with the valve portion interposed between said one wall of the heating vessel and the adjacent wall of the separator vessel and immersed in the heating medium.

2. A low temperature production apparatus for use with well fluids comprising a horizontally extending cylindrical heating tank of a given diameter, a separator unit including a cylindrical separator tank of a substantially smaller diameter disposed within the heating tank with the axis of the separator tank disposed substantially above the axis of the heating tank, said heating tank being substantially filled with a fluid heat transfer medium so that the transfer medium contacts substantially all of the outer surface of the separator tank, fire tube means disposed within and extending generally parallel to but spaced below the axis of the heating tank to transfer heat to the transfer medium, a well fluid inlet line passing through the heating tank, and choke means connected to the inlet line for supplying the well fluid to the separator tank, said choke means including a pressure reducing portion disposed substantially entirely in the heat transfer medium interposed between the wall of the heating tank and the wall of the separator tank.

3. A low temperature production apparatus for use with well fluids comprising a horizontally extending cylindrical heating tank of a given diameter, a separator unit including a cylindrical separator tank of a substantially smaller diameter disposed within the heating tank with the axis of the separator tank disposed substantially above the axis of the heating tank, said heating tank being substantially filled with a fluid heat transfer medium so that the transfer medium contacts substantially all of the outer surface of the separator tank, fire tube means disposed within and extending generally parallel to but spaced below the axis of the heating tank to transfer heat to the transfer medium, a well fluid inlet line, choke means for delivering well fluid to the separator tank and connected to the well fluid inlet line, said choke means including a valve portion and a control portion, and means mounting said choke means with said control portion positioned outside of said heating tank and with said valve portion interposed between the walls of the heating tank and the separator tank with the valve portion immersed in the heat transfer medium.

4. A low temperature production apparatus for use with well fluids comprising a heating vessel, a separator vessel substantially completely disposed within the heating vessel spaced from the heating vessel, said heating vessel being adapted to receive a body of fluid heating medium contacting the walls of the separator vessel, fire tube means in the heating vessel disposed below the separator vessel and immersed in the heating medium, fluid conveying means passing through the interior of the separator vessel and having inlet and outlet means in open communication with and disposed below the upper surface of the heating medium in the heating vessel, the heating medium in the fluid conveying means heating the interior of the separator vessel and a choke valve for admitting well fluid to the separator vessel, the valve element disposed between the walls of the separator and heating vessels and surrounded by the heating medium.

5. A low temperature production apparatus for use with well fluids comprising a heating vessel for receiving a body of fluid heating medium, a generally cylindrical separator vessel substantially completely disposed within the heating vessel with the axis of the separator vessel extending generally horizontal, said separator vessel being substantially immersed in the heating medium, fire tube means disposed in the heating vessel spaced below the separator vessel and extending generally parallel to its axis, fluid conveying means passing through the interior of the separator vessel but sealed from the communication therewith, said fluid conveying means including ports in open communication with the interior of the heating vessel below the upper surface of the heating medium to provide means for heating the interior of the separator vessel and a choke valve for admitting well fluid to the separator vessel, the valve element disposed between the walls of the separator and heating vessels and surrounded by the heating medium.

6. The low temperature production apparatus set forth in claim 5 in which the fluid conveying means includes a plurality of separate conveying means spaced from each other along the axis of the separator vessel and extending generally transverse to this axis.

7. The low temperature production apparatus set forth in claim 5 in which the fluid conveying means includes a plurality of separate conveying means extending generally parallel to the axis of the separator vessel.

8. A low temperature production apparatus for use with well fluids comprising a heating vessel for receiving a body of fluid heat transfer medium, a generally cylindrical separator vessel disposed in the heating vessel with the axis of the separator vessel extending generally horizontal, said separator vessel being substantially immersed in the heat transfer medium, fire tube means disposed in the heating vessel below the separator tank and including at least two sections extending generally parallel to the axis of the separator vessel, fluid conveying means in said separator vessel and sealed from communication with the interior of the separator vessel, inlet means connected to the fluid conveying means to supply the heat transfer medium to the fluid conveying means, and outlet means connected to the fluid conveying means and extending between the sections of the fire tube means for returning the heat transfer medium to the heating vessel.

9. The apparatus set forth in claim 8 in which the inlet means includes a port opening into the heating vessel at a point disposed above the outlet means and below the upper level of the heat transfer medium.

10. The apparatus set forth in claim 8 in which the fluid conveying means includes a plurality of spaced conveying means extending generally parallel to but spaced below the axis of the separator vessel.

11. A low temperature production apparatus for use with well fluids comprising an elongated cylindrical heating vessel mounted in a general horizontal position, a separator unit including a cylindrical vessel substantially completely disposed within the heating vessel with the axis of the separator vessel positioned above the axis of the heating vessel, the heating vessel being adapted to be substantially filled with a heat transfer medium in which the separator vessel is substantially immersed, fire tube means disposed in the heating vessel below the separator vessel to heat the heat transfer medium, choke means for supplying well fluid to the separator unit and including both a valve portion and a control portion, means mounting the choke means on the apparatus with the control portion outside the heating vessel and with the valve portion between the wall of the heating vessel and the wall of the separator vessel contacting the heat transfer medium, structure forming a recessed area in the wall of the heating vessel disposed adjacent the fire tube means and terminating in an arcuate section of the wall of the separator vessel, and control means mounted in the recessed area for controlling the operation of the production unit.

12. The apparatus set forth in claim 11 in which the choke means extends generally transverse to the axis of the heating vessel and is disposed above the axis of the heating vessel.

13. The apparatus set forth in claim 11 including fluid conveying means passing through but sealed from communication with the interior of the separator vessel, said fluid conveying means being in open communication with the heating medium in the heating vessel in proximity to the fire tube means.

14. A low temperature production unit for use with well streams including gas and liquid components comprising a heating vessel adapted to be at least partially filled with a heat transfer medium, heating means for heating the heat transfer medium, a separator vessel disposed at least partially within the heating vessel with at least a portion of its outer wall surface contacting the heat transfer medium, partition means within the separator vessel dividing at least a portion of the interior of the separator vessel into a gas space and a liquid space with the gas space overlying and separated from the liquid space by the partition means, and heat transfer conveying means communicating with the heat transfer medium in the heating vessel and passing through the interior of the separator vessel sealed from communication therewith, the conveying means including surfaces exposed to the gas space on one side of the partition means and surfaces exposed to the liquid space on the other side of the partition means to permit the transfer of heat between the heat transfer medium passing through the conveying means and the gas and liquid spaces.

15. A low temperature production unit for use with well streams including gas and liquid components comprising a heating vessel adapted to be at least partially filled with a heat transfer medium, heating means for heating the heat transfer medium, a generally cylindrical separator vessel disposed at least partially within the heating vessel with a least a portion of its outer wall surface contacting the heat transfer medium, partition means within the separator vessel extending longitudinally along the axis of the cylindrical separator vessel and extending transversely to the axis in juxtaposition to the walls of the cylindrical vessel to divide at least a portion of the interior of the separator vessel into a gas space overlying and separated from a liquid space by the partition means, and fluid conveying means communicating with the heat transfer medium in the heating vessel and passing through the interior of the separator vessel sealed from communication therewith, said fluid conveying means extending generally parallel to the partition means and including first surfaces disposed on one side of the partition means and exposed to the gas space and second surfaces disposed on the other side of the partition means exposed to the liquid space.

16. A production unit for use with well streams including gas and liquid components comprising a separator vessel having a well stream inlet spaced from a gas outlet in a given direction, partition means within the vessel extending in said direction and dividing the interior of the separator vessel into a gas space overlying and separated from a liquid space by the partition means, said gas space being in communication with the inlet, conveying means within the interior of the vessel but sealed from communication therewith for conveying a heat transfer medium, said conveying means forming a part of the partition means and including surfaces exposed to the gas space on one side of the partition means and surfaces exposed to the liquid space on the other side of the partition means, and means for supplying a heat transfer medium to the conveying means.

17. A production unit for use with a well stream including gas and liquid components comprising an elongated and generally horizontally disposed cylindrical separator vessel, gas outlet means in said vessel, well stream inlet means in said vessel spaced along said axis from the gas outlet means, fluid conveying means within the vessel extending generally parallel to the axis of the vessel, partition means within the vessel cooperating with the fluid conveying means to form a wall dividing at least a portion of the interior of the vessel into a gas space overlying a liquid collecting space, the conveying means having upper surfaces exposed to the gas space and lower surfaces exposed to the liquid collecting space, and means for supplying a heat transfer medium to the conveying means.

18. The production unit set forth in claim 17 in which the conveying means includes a plurality of parallel and spaced conveying lines and in which the partition means includes structures disposed between the lines to form the wall.

References Cited

UNITED STATES PATENTS

| | | | |
|---|---|---|---|
| 2,354,932 | 8/1944 | Walker et al. | 62—37 X |
| 2,625,915 | 1/1953 | Glasgow et al. | |
| 2,990,691 | 7/1961 | Glasgow | 55—175 X |
| 3,012,629 | 12/1961 | Walker et al. | |
| 3,078,648 | 2/1963 | Edmondson | 55—202 |
| 3,119,674 | 1/1964 | Glasgow et al. | 55—174 |

OTHER REFERENCES

The Original Winterized Combination Indirect-Heater and Oil and Gas Separator That Has Set the Trend in the Industry by Sauder Tank Co. Inc., received in Patent Office Dec. 3, 1962.

WILBUR L. BASCOMB, JR., *Primary Examiner.*

NORMAN YUDKOFF, *Examiner.*

V. W. PRETKA, *Assistant Examiner.*